Sept. 4, 1956
J. H. GASTON
2,761,236
AUXILIARY HAND GRIP FOR A FISHING ROD
Filed Aug. 18, 1954
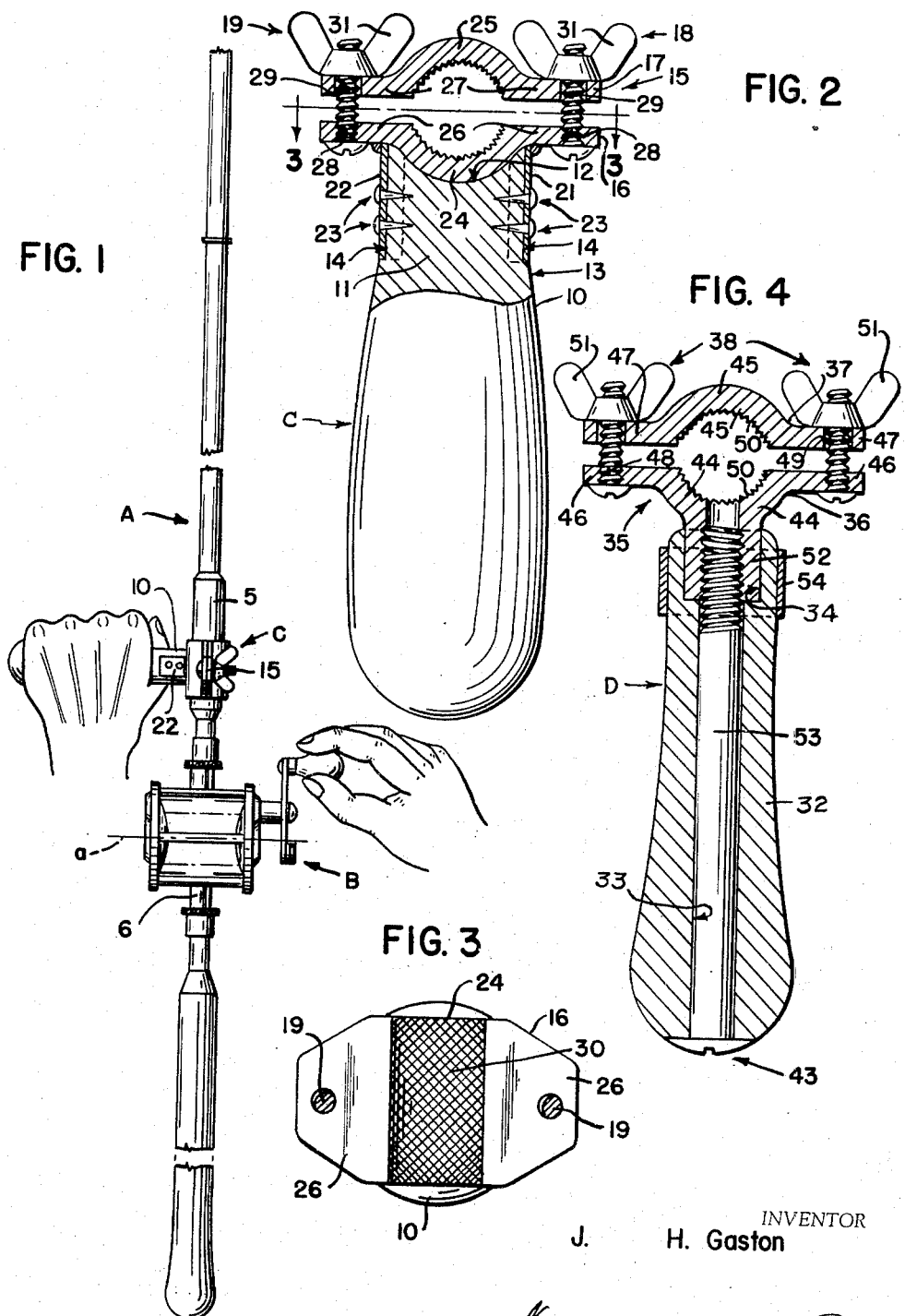
INVENTOR
J. H. Gaston – # United States Patent Office 2,761,236
Patented Sept. 4, 1956

2,761,236

AUXILIARY HAND GRIP FOR A FISHING ROD

Joscelyn Herbert Gaston, Baltimore, Md.

Application August 18, 1954, Serial No. 450,571

1 Claim. (Cl. 43—25)

This invention relates to attachments to fishing rods and more specifically to auxiliary hand grips for attachment to such rods.

An important object of the invention is to provide an auxiliary hand grip for attachment to a fishing rod to extend substantially normal to the longitudinal axis of the rod for gripping by one hand of the fisherman, while he employs his other hand in reeling and otherwise. I have ascertained that such a specific disposition of the auxiliary grip with reference to the rod permits a firmer and less tiring grasp of the grip than when the latter is disposed at angles other than a right angle with reference to the rod. This is partly due to the fact that the axis of rotation of the reel is also normal to the longitudinal axis of the rod and that, in reeling, there is less tendency of the rod to vibrate and oscillate when an auxiliary grip is disposed as set out herein. In the case of an auxiliary grip paralleling, or substantially paralleling, the longitudinal axis of the rod, there is a tendency on the part of the fisherman to pull the rod towards his body as he attempts to hold the grip steady if the rod starts to oscillate. This is not the case when the grip is disposed as provided for in this specification.

Another important object is to provide an auxiliary grip for fishing rods which may be attached thereto without altering the rod, such as by drilling or grooving. My grip clamps on and its position along the rod may be changed as desired.

Still another important object is to provide an attachable auxiliary hand grip for a fishing rod which grip embodies few projections which would be apt to catch the line or catch onto the fisherman's clothing.

Other objects and advantages of the invention will be apparent during the course of the following detailed description of the invention, taken in connection with the accompanying drawing forming a part of this disclosure and in which drawing:

Fig. 1 is a plan view of the new auxiliary hand grip attached to a fishing rod.

Fig. 2 is a view partly in plan and partly in longitudinal section of one embodiment of the invention detached from a rod.

Fig. 3 is an inner face view of one element of the clamping means of the auxiliary grip, substantially on the line 3—3 of Fig. 2.

Fig. 4 is a view mostly in longitudinal section of another embodiment of the invention.

In the drawing, wherein for the purpose of illustration is shown two embodiments of the invention and wherein similar reference characters designate corresponding parts throughout the several views, the letter A designates a fishing rod with reel B and the letters C and D designate two embodiments of the new auxiliary hand grip.

The rod A is of conventional construction and is shown merely as an example and includes the longitudinally extending grip 5 and reel seat 6 therebelow, for mounting the conventional reel B. Either auxiliary hand grip C or D may be attached to the rod A or, in fact, to substantially any rod.

Referring mainly to Fig. 2, the auxiliary hand grip C includes a handle or grip body 10 which is somewhat elongated, may have a substantially circular transverse cross section and may be of wood, hardened synthetic plastic material or the like. The inner end portion 11 has a concave recess 12 to receive a portion of the clamping means 15 and, inwardly of recess, the side face 13 of the body 10 is provided with preferably two longitudinally-extending grooves or recesses 14 spaced substantially 180° apart also to receive portions of the means 15 to be next described.

The clamping means 15 comprises an innermost body member 16 and an outermost body member 17, two bolt and nut assemblies 18 and 19, and attaching means 23 for attaching groove-engaging members 21 and 22 to the handle or grip body 10.

Each body member 16 and 17 comprises a central concave grip-engaging portion 24 or 25, as the case may be, and two bolt-shank receiving wings 26 or 27, as the case may be, extending from opposite ends of their respective grip-engaging portion and integral therewith. Each wing is provided with a suitable bolt shank-receiving opening 28 or 29, as the case may be. The inner faces of the grip-engaging portions 24 and 25 are preferably roughened, as knurled, as is the portion 24, shown by way of example, at 30 in Fig. 3 for firm engagement with the grip 5.

The groove-engaging members or projections 21 and 22 are preferably plates fixedly attached to the body member 16 to extend into the grooves 14 and may be provided with spaced-apart openings to receive portions of the attaching means 23 which may be screws with parts of the shanks extending into these openings and into the adjacent parts of the inner end portions 11 of the handle or grip body 10. The heads of the screws bear, of course, upon the outer face of the members 21 and 22.

The bolt and nut assemblies 18 and 19 are conventional and conventionally used. I prefer to employ wing nuts 31.

Referring now to Fig. 4, the embodiment D of the invention is much like C, differing only in the means for attaching the clamping means to the handle or hand grip body 32 which latter has no grooves or recesses like those of the body 10, but is provided with a longitudinal bore 33 and a recess or enlargement 34 at its inner end opening to the bore 33. The clamping means 35 comprises the body members 36 and 37, bolt and nut assemblies 38 and 39, and attaching means 43.

The two body members 36 and 37 have central gripengaging portions 44 and 45 respectively, and each portion 44 and 45 has wings 46 and 47 respectively, which wings 46 and 47 are provided with bolt shank-receiving openings 48 and 49 respectively and the portions 44 and 45 preferably have their concave inner faces roughened, as being knurled as indicated at 50 in Fig. 4.

The attaching means 43 includes a projection comprising an interiorly screw threaded preferably cylindrical projection or lug 52 rigid and integral with the body member 36 and extending from the outer face of its portion 44. This projection or lug 52 is interiorly screw threaded and adapted to fit snugly within the recess 34. An elongated screw member 53 extends through the bore 33 and its screw threads engage those of the projection 52 while its head abuts the outer end face of the handle or grip body 32 whereby the body member 36 is detachably connected with the handle or grip body. I may provide a ferrule 54 to extend around the outer surface of the handle or grip the body 32 at its inner end portion.

All that is required to attach either auxiliary hand grip C or D to a rod is to loosen the means 23 or 43, slip the grip upon the rod at the desired location, preferably that of the grip 5 and tighten the means 23 or 43. The auxiliary hand grip is grasped by a right-handed person with his left hand, leaving his right hand free to manipulate the reel B. In the case of a left-handed person, the grip C or D and reel is positioned at the opposite side of the rod from their positions in Fig. 1. In either case, the longitudinal axis of the grip C or D extends at right angles with or normal to the longitudinal axis of the rod and substantially parallel with the longitudinal axis $a$ of rotation of the reel B.

Various changes in the shape, size and arrangement of parts may be made to the forms of invention herein shown and described, without departing from the spirit of the invention or scope of the claim.

What is claimed is:

An auxiliary hand grip for a fishing rod, said grip including an elongated handle body having an end-opening centrally-disposed recess at its inner end and a longitudinal bore extending from the bottom of said recess to the outer end of said handle body; clamping means for detachably securing said handle body to said rod, including an innermost body member and an outermost body member, both with their longitudinal axes normal to the longitudinal axis of said handle body and each having a rod-engaging inner face, the innermost body member having a rigid portion integral therewith extending into said recess and in intimate contact with the side and bottom walls thereof and being provided with a screw threaded bore extending to said longitudinal bore, means carried by said body members to position the outermost body member in selected secured positions adjacent the innermost body member with their inner faces facing one another and in intimate contact with said rod; and means extending into and outwardly of said rigid portion and handle body for securing said innermost body member to said handle body comprising an elongated screw member extending through said longitudinal bore and rotatable therein and with respect to said handle body and having screw threads at its inner end engaging the screw threads of said screw threaded bore, and having an enlargement at its outer end in contact with the outermost end face of said handle body for manually rotating said elongated screw member.

References Cited in the file of this patent

UNITED STATES PATENTS

| 445,192 | Nye | Jan. 27, 1891 |
| 787,354 | Cassel | July 11, 1904 |
| 2,297,577 | Monte | Sept. 29, 1942 |
| 2,305,045 | Torrence | Dec. 15, 1942 |
| 2,439,623 | Howells | Apr. 13, 1948 |
| 2,576,629 | Morby | Nov. 27, 1951 |

FOREIGN PATENTS

| 20,882 | Great Britain | 1896 |